(12) United States Patent
Iwasawa (10) Patent No.: US 8,643,885 B2
(45) Date of Patent: Feb. 4, 2014

(54) PRINTING CONTROL APPARATUS AND NON-TRANSITORY COMPUTER READABLE MEDIUM WITH SETTING AUTHENTICATION INFORMATION IN A DEVMODE STRUCTURE

(75) Inventor: Masayuki Iwasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/563,091

(22) Filed: Jul. 31, 2012

(65) Prior Publication Data

US 2013/0215441 A1    Aug. 22, 2013

(30) Foreign Application Priority Data

Feb. 16, 2012    (JP) ................................. 2012-031617

(51) Int. Cl.
*G06F 3/12* (2006.01)
(52) U.S. Cl.
USPC .......................................... 358/1.15; 358/1.1
(58) Field of Classification Search
USPC .................................................. 358/1.15, 1.1
See application file for complete search history.

(56) References Cited

U.S. PATENT DOCUMENTS

2004/0250264 A1* 12/2004 Kato ............................. 719/321
2007/0070420 A1*  3/2007 Kizaki et al. ................. 358/1.15
2008/0068655 A1*  3/2008 Kimura ........................ 358/1.16
2011/0075188 A1   3/2011 Yajima

FOREIGN PATENT DOCUMENTS

JP    A-2011-81781    4/2011

* cited by examiner

*Primary Examiner* — Qian Yang
*Assistant Examiner* — Martin Mushambo
(74) *Attorney, Agent, or Firm* — Oliff PLC (57) ABSTRACT

A printing control apparatus includes an acquiring unit, a storage unit, a specifying unit, a setting unit, and a transmitting unit. The acquiring unit acquires information concerning a printer driver name in accordance with a received print instruction. The storage unit stores a table in which the printer driver name and definition information which defines a setting location of authentication information in a DEVMODE structure are associated with each other. The specifying unit specifies the setting location of the authentication information in accordance with the acquired information concerning the printer driver name and the table stored in the storage unit. The setting unit sets the authentication information in the specified setting location. The transmitting unit generates print data having the authentication information in accordance with setting content of the DEVMODE structure in which the authentication information has been set, and transmits the print data to an output destination printer.

13 Claims, 11 Drawing Sheets

| DEVMODE STRUCTURE | PUBLIC AREA | · NAME OF OUTPUT DESTINATION PRINTER<br>· VERSION OF OS<br>· VERSION OF DEVMODE STRUCTURE<br>· SIZE OF DEVMODE STRUCTURE<br>· SIZE OF PRIVATE AREA<br>· EFFECTIVE MEMBER<br>· PAPER ORIENTATION<br>· PAPER ID<br>· PAPER HEIGHT<br>· PAPER WIDTH<br>· MAGNIFICATION/REDUCTION RATIO<br>· NUMBER OF COPIES<br>· PAPER TRAY<br>· RESOLUTION<br>· COLOR PRINTING<br>· DUPLEX PRINTING<br>· Y-DIRECTION RESOLUTION<br>· FONT OPTION<br>· COLLATION<br>· FORM NAME |
|---|---|---|
| | PRIVATE AREA | · XXXXXX<br>· XXXXXX<br>· XXXXXX<br>· AUTHENTICATION INFORMATION<br>· XXXXXX<br>· XXXXXX<br>· XXXXXX<br>· XXXXXX<br>· XXXXXX |

FIG. 5

| DEVMODE STRUCTURE | PUBLIC AREA | · NAME OF OUTPUT DESTINATION PRINTER<br>· VERSION OF OS<br>· VERSION OF DEVMODE STRUCTURE<br>· SIZE OF DEVMODE STRUCTURE<br>· SIZE OF PRIVATE AREA<br>· EFFECTIVE MEMBER<br>· PAPER ORIENTATION<br>· PAPER ID<br>· PAPER HEIGHT<br>· PAPER WIDTH<br>· MAGNIFICATION/REDUCTION RATIO<br>· NUMBER OF COPIES<br>· PAPER TRAY<br>· RESOLUTION<br>· COLOR PRINTING<br>· DUPLEX PRINTING<br>· Y-DIRECTION RESOLUTION<br>· FONT OPTION<br>· COLLATION<br>· FORM NAME |
|---|---|---|
| | PRIVATE AREA | · XXXXXXX<br>· XXXXXXX<br>· XXXXXXX<br>· XXXXXXX<br>· XXXXXXX<br>· AUTHENTICATION INFORMATION<br>· XXXXXXX<br>· XXXXXXX<br>· XXXXXXX<br>· XXXXXXX<br>· XXXXXXX<br>· XXXXXXX<br>· XXXXXXX |

ADD-IN DEFINITION FILE

| PRINTER DRIVER NAME | LIBRARY MODULE NAME |
|---|---|
| ABCD7780 | LIBRARY MODULE A |
| ABCD4400 | LIBRARY MODULE A |
| MFD4600 | LIBRARY MODULE B |
| DBMPM3500 | LIBRARY MODULE C |

FIG. 7

| LIBRARY MODULE NAME | DEFINITION |
|---|---|
| LIBRARY MODULE A | SET AUTHENTICATION INFORMATION IN THE 10TH BYTE OF PRIVATE AREA IN DEVMODE STRUCTURE |
| LIBRARY MODULE B | SET AUTHENTICATION INFORMATION IN THE 24TH BYTE OF PRIVATE AREA IN DEVMODE STRUCTURE |
| LIBRARY MODULE C | SET AUTHENTICATION INFORMATION IN THE 14TH BYTE OF PRIVATE AREA IN DEVMODE STRUCTURE |

PRINTING CONTROL APPARATUS AND NON-TRANSITORY COMPUTER READABLE MEDIUM WITH SETTING AUTHENTICATION INFORMATION IN A DEVMODE STRUCTURE

CROSS-REFERENCE TO RELATED APPLICATIONS

This application is based on and claims priority under 35 USC 119 from Japanese Patent Application No. 2012-031617 filed Feb. 16, 2012.

BACKGROUND (i) Technical Field

The present invention relates to a printing control apparatus and a non-transitory computer readable medium.

SUMMARY

According to an aspect of the invention, there is provided a printing control apparatus including an acquiring unit, a storage unit, a specifying unit, a setting unit, and a transmitting unit. The acquiring unit acquires information concerning a printer driver name to be used to control an operation of a printer, in accordance with a received print instruction. The storage unit stores a table in which the printer driver name and definition information in which a setting location of authentication information in a DEVMODE structure is defined are associated with each other. The DEVMODE structure is a group of pieces of information to be referred to by a printer driver to generate print data. The specifying unit specifies the setting location of the authentication information in the DEVMODE structure, in accordance with the information concerning the printer driver name acquired by the acquiring unit and the table stored in the storage unit. The setting unit sets the authentication information in the setting location in the DEVMODE structure specified by the specifying unit. The transmitting unit generates print data having the authentication information in accordance with setting content of the DEVMODE structure in which the authentication information has been set by the setting unit, and transmits the print data to a printer at an output destination.

BRIEF DESCRIPTION OF THE DRAWINGS

An exemplary embodiment of the present invention will be described in detail based on the following figures, wherein.

DETAILED DESCRIPTION

Figure 1:
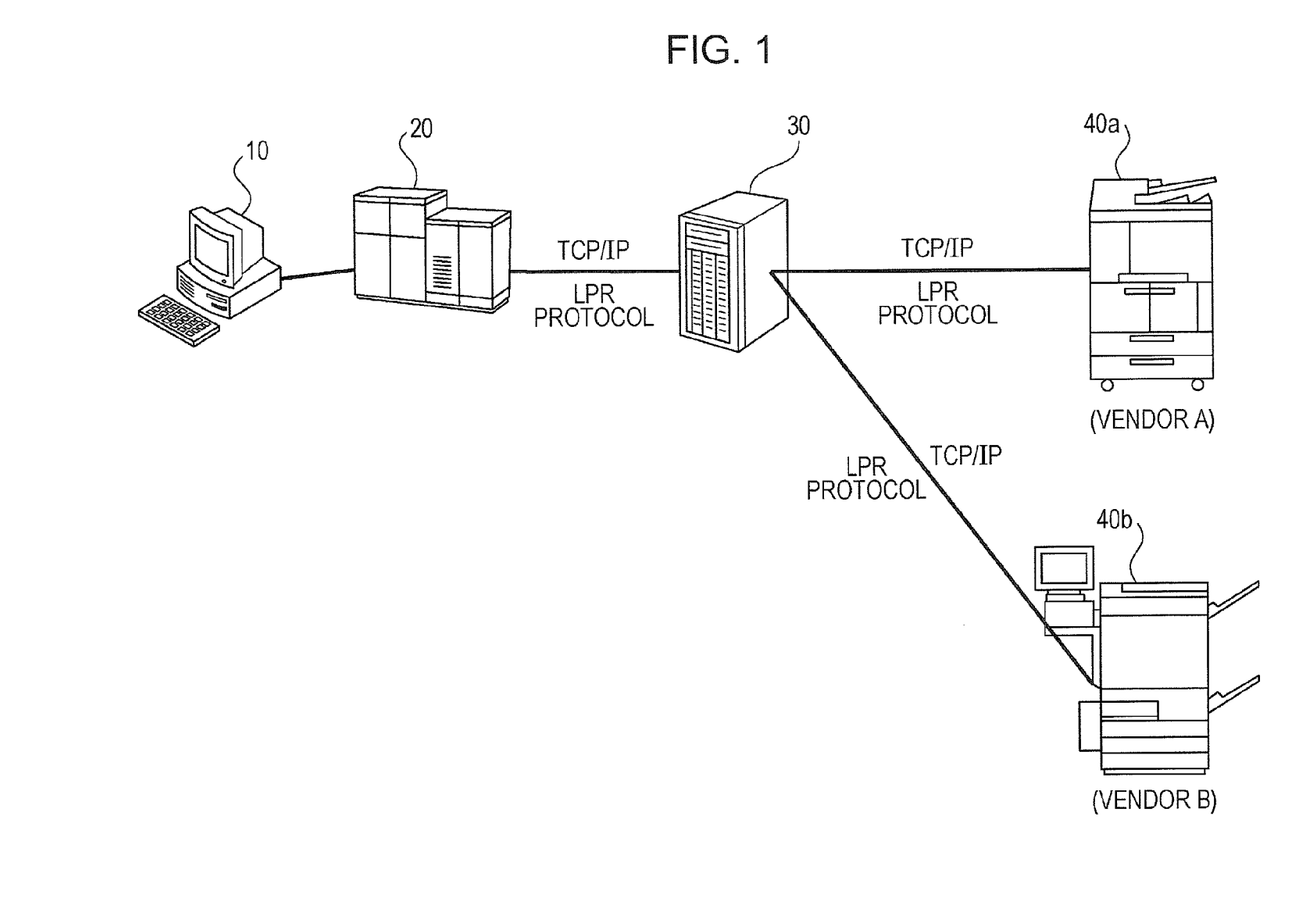
FIG. 1 illustrates a system configuration of a printing system according to an exemplary embodiment of the present invention.

An exemplary embodiment of the present invention will be described in detail hereinafter with reference to the drawings. FIG. 1 is a block diagram illustrating the configuration of a printing system according to an exemplary embodiment of the present invention.

As illustrated in FIG. 1, a printing system according to an exemplary embodiment of the present invention includes a terminal apparatus (or client apparatus) 10, a host computer 20, a print server 30, and printers 40a and 40b. The terminal apparatus 10, the host computer 20, the print server 30, and the printers 40a and 40b communicate with one another via a network such as a local area network using a protocol such as Transmission Control Protocol/Internet Protocol (TCP/IP). Further, print jobs (or print instructions) are transmitted from the host computer 20 to the print server 30 and then from the print server 30 to the printers 40a and 40b using a protocol such as the Line Printer Daemon protocol (LPR).

The printer 40a is manufactured by a vendor (or manufacturer) A, and the printer 40b is manufactured by a vendor B.

In the printing system illustrated in FIG. 1, for example, when an operator (user A) transmits a print job stored in a storage device in the host computer 20 to the printer 40b manufactured by the vendor B using the terminal apparatus 10, the host computer 20 transmits the print job to the print server 30 using the LPR protocol. Since the print job is transmitted using the LPR protocol, the print job includes, in addition to print data, attribute information about the print data, called a control file. The attribute information is constituted by information based on the specifications of the LPR protocol, such as a user name, a logical printer name, and a print job name. The print data is written in a page description language supported by the print server 30.

Figure 2:
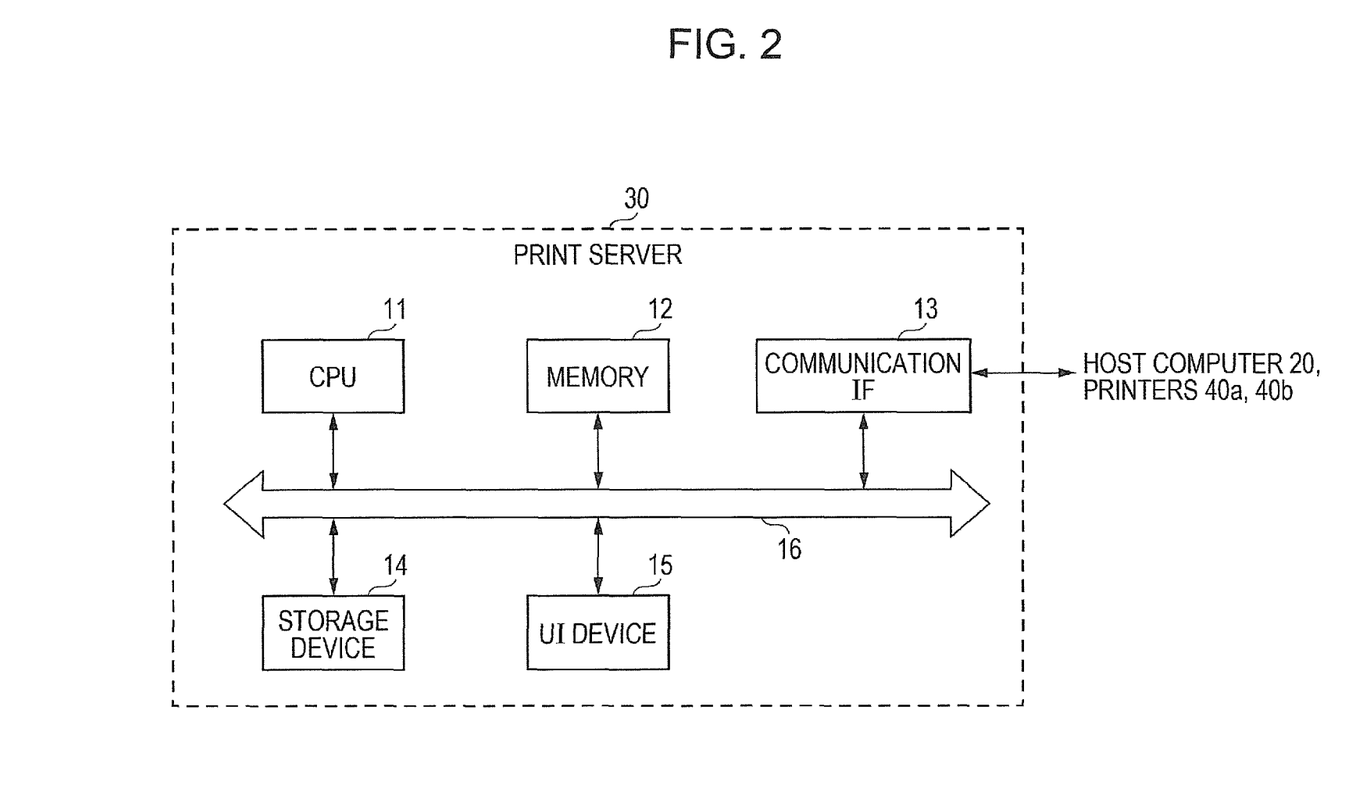
FIG. 2 is a block diagram illustrating a hardware configuration of a print server according to the exemplary embodiment of the present invention.

FIG. 2 illustrates a hardware configuration of the print server 30 in the printing system according to this exemplary embodiment.

As illustrated in FIG. 2, the print server 30 includes a central processing unit (CPU) 11, a memory 12, a communication interface (IF) 13 used to transmit and receive data to and from an external device or the like via a network, a storage device 14 such as a hard disk drive (HDD), and a user interface (UI) device 15 including a touch panel or a liquid crystal disk and a keyboard. The above components are connected to one another via a control bus 16.

The CPU 11 executes a predetermined process in accordance with a control program stored in the memory 12 or the storage device 14 to control the operation of the print server 30. In this exemplary embodiment, by way of example, the CPU 11 is configured to read and execute the control program stored in the memory 12 or the storage device 14. Alternatively, the program may be stored in a storage medium such as a compact disc read-only memory (CD-ROM) and may be provided to the CPU 11.

Figure 3:
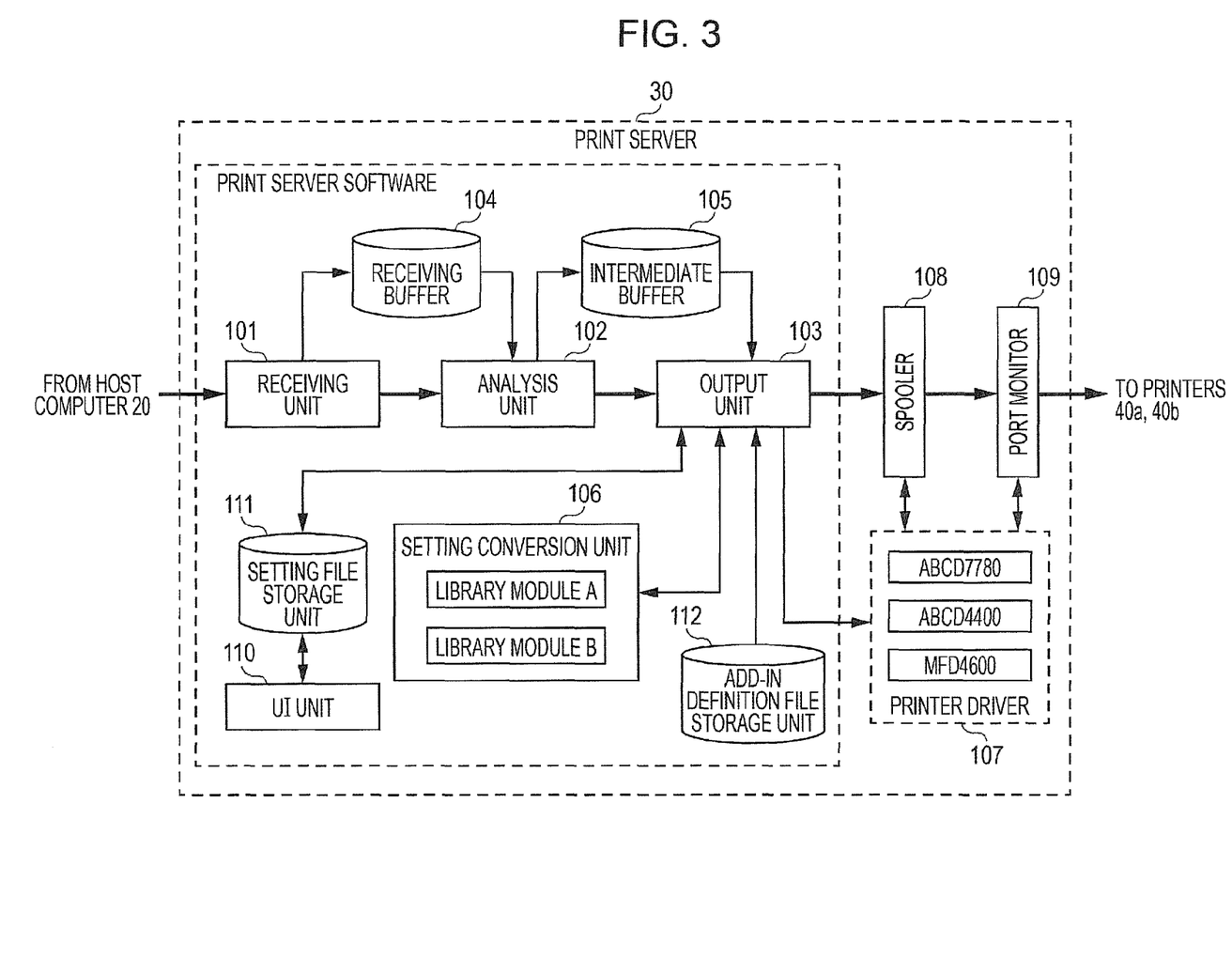
FIG. 3 is a block diagram illustrating a functional configuration of the print server according to the exemplary embodiment of the present invention.

FIG. 3 is a block diagram illustrating a functional configuration of the print server 30, which is implemented by the execution of the control program described above.

As illustrated in FIG. 3, the print server 30 according to this exemplary embodiment includes a receiving unit 101, an analysis unit 102, an output unit 103, a receiving buffer 104, an intermediate buffer 105, a setting conversion unit 106, a printer driver 107, a spooler 108, a port monitor 109, a UI unit 110, a setting file storage unit 111, and an add-in definition file storage unit 112.

While continuously receiving a print job transmitted from the host computer 20 until the reception of the print job has been completed, the receiving unit 101 writes the received print job to the receiving buffer 104.

The analysis unit 102 sequentially reads the print job written to the receiving buffer 104, and extracts from the read print job a logical printer name, which is necessary to add authentication, a user name used as authentication information, and information necessary to control a printer, such as the size of printing paper and the print job name, and writes the extracted information to the intermediate buffer 105 as control information together with the print data.

In this exemplary embodiment, by way of example, information concerning a user name is used as authentication information. Specifically, a user name included in attribute information of a print job is set as authentication information, and a printer at an output destination is permitted to print the print job under a condition where, for example, the password corresponding to the user name set as the authentication information is entered. However, the present invention is not limited to this configuration, and information other than a user name, such as a print job name, may be set as authentication information.

In response to a request from the analysis unit 102, the output unit 103 reads the control information and the print data from the intermediate buffer 105, and transmits the control information to the setting conversion unit 106 to make a conversion request.

In accordance with the control information received from the output unit 103, the setting conversion unit 106 creates a DEVMODE structure for setting control information necessary to control the printer, such as authentication information, in the printer driver 107, and returns the DEVMODE structure to the output unit 103.

Figure 4:
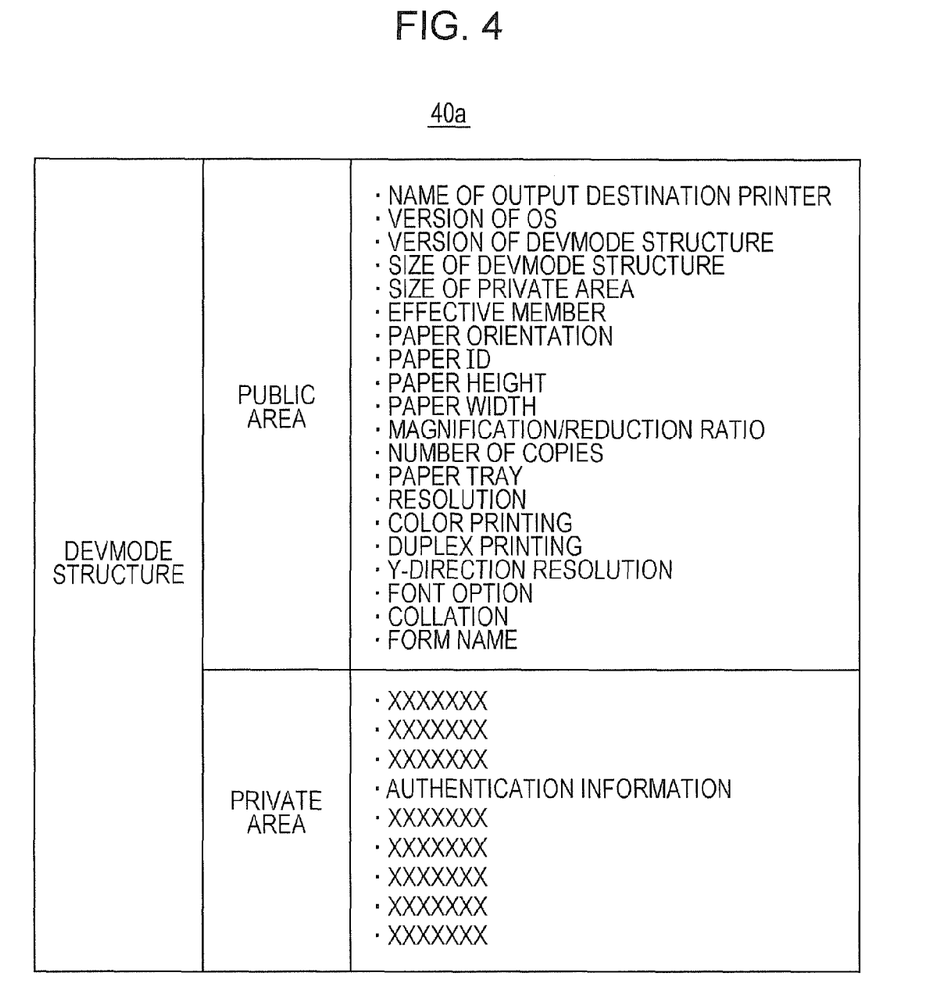
FIG. 4 illustrates an example of a DEVMODE structure used to generate print data to be output to a printer manufactured by a vendor.
Figure 5:
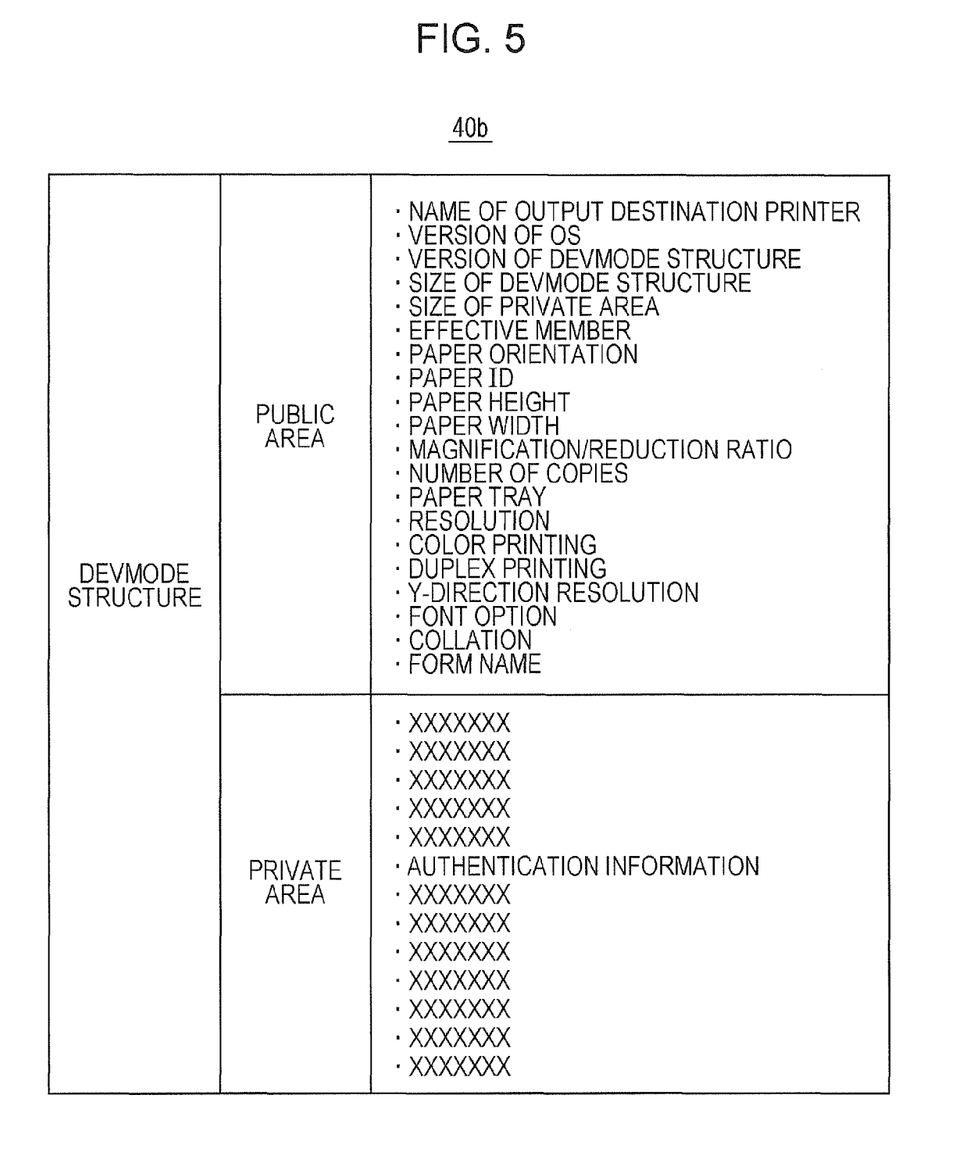
FIG. 5 illustrates an example of a DEVMODE structure used to generate print data to be output to a printer manufactured by another vendor.

The DEVMODE structure is a group of pieces of information to be referred to by the printer driver 107 to generate print data. Specific examples of the DEVMODE structure are illustrated in FIGS. 4 and 5. As illustrated in FIGS. 4 and 5, the DEVMODE structure has two areas called a public area and a private area. The public area includes basic information defined by an operating system (OS), which is common to vendors/printer drivers, such as setting of paper, resolution, and double-sided or duplex printing. The private area serves as an extension setting area that is freely usable by each vendor/each printer driver, and items set in the private area and the locations of the set items are different depending on each vendor/each printer driver. Since the authentication information is set in the private area, the location where the authentication information is set is different depending on each vendor/each printer driver.

FIG. 4 illustrates an example of the DEVMODE structure used to generate print data to be output to the printer 40a manufactured by the vendor A, and FIG. 5 illustrates an example of the DEVMODE structure used to generate print data to be output to the printer 40b manufactured by the vendor B.

The details of a specific method of generating a DEVMODE structure using the setting conversion unit 106 will be described in detail below.

The output unit 103 requests the printer driver 107 to set the control information and to perform printing, using the DEVMODE structure created by the setting conversion unit 106, converts the print data into graphical device interface (GDI) data, which is written in the graphic language of the printer driver 107, and outputs the GDI data to the spooler 108. Through the above process, the printer driver 107 outputs the print data having the authentication information to the printer specified as the output destination via the port monitor 109.

That is, the printer driver 107 generates print data having authentication information in accordance with the setting items in the DEVMODE structure in which the authentication information is set, and transmits the print data to the printer specified as the output destination (a "transmitting unit").

Since printer drivers compatible with the models of printers are necessary, in the example illustrated in FIG. 3, the printer driver 107 includes three printer drivers "ABCD7780", "ABCD4400", and "MFD4600". When a printer at an output destination is specified, the printer driver corresponding to the specified printer is used.

Figure 6:
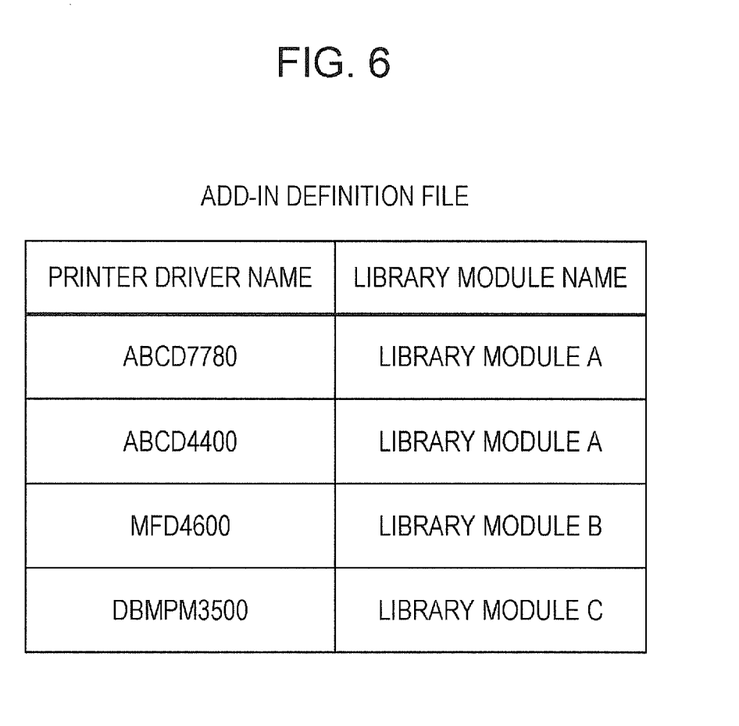
FIG. 6 illustrates an example of an add-in definition file stored in an add-in definition file storage unit.

The add-in definition file storage unit 112 stores an add-in definition file. The add-in definition file is a table in which a printer driver name and a library module (definition information) that defines a location where authentication information is set in the DEVMODE structure (hereinafter also referred to as the "setting location of authentication information in the DEVMODE structure") are associated with each other. FIG. 6 illustrates an example of the add-in definition file.

In the add-in definition file illustrated in FIG. 6, for example, "library module A" is set as the library module corresponding to the printer driver name "ABCD7780". Further, "library module B" is set as the library module corresponding to the printer driver name "MFD4600".

The setting conversion unit 106 uses an add-in library module as a module that creates a DEVMODE structure for setting control information necessary to control a printer, such as authentication information, in the printer driver 107. The term "add-in" is used to mean a format that helps easily add a feature. In FIG. 3, two library modules, that is, the library module A and the library module B, are set in the setting conversion unit 106. Since the add-in format is used, additional library modules other than the above two library modules may be easily added.

As described above, the location where authentication information is set in the DEVMODE structure is different depending on each vendor/each printer driver. Thus, if a new printer driver is added to the printer driver 107 because a printer manufactured by a new vendor or a new printer driver is added to the printing system as a printer at an output destination, a library module corresponding to the added printer driver is added to the setting conversion unit 106.

If the setting conversion unit 106 has plural library modules set therein, the output unit 103 reads information concerning the logical printer name set as an output destination from a setting file stored in the setting file storage unit 111, in accordance with the attribute information of the print job received by the receiving unit 101, and acquires information concerning the printer driver name to be used from OS definition information in accordance with the read information concerning the logical printer name (an "acquiring unit"). The output unit 103 acquires the library module name corresponding to the acquired printer driver name from the add-in definition file storage unit 112, thereby specifying the library module to be used, that is, the setting location of the authentication information in the DEVMODE structure (a "specifying unit").

Figure 7:
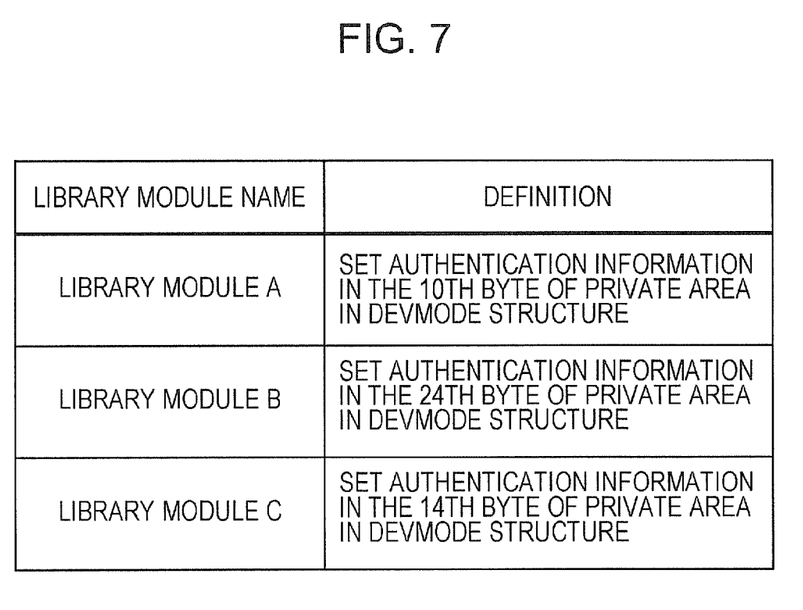
FIG. 7 illustrates an example of a location where authentication information is set in the DEVMODE structure defined in each library module.

For example, as illustrated in FIG. 7, the library module A defines a location where the authentication information is set, that is, that the authentication information is set in the 10th byte of the private area in the DEVMODE structure. Therefore, specifying the library module to be used allows a location where the authentication information is set in the DEVMODE structure to be specified.

In accordance with the control information received from the output unit 103, the setting conversion unit 106 creates a DEVMODE structure and returns the DEVMODE structure to the output unit 103. In this process, the setting conversion unit 106 performs setting of a DEVMODE structure using the library module specified by the output unit 103, thereby setting the authentication information in the setting location in the DEVMODE structure specified by the output unit 103 (a "setting unit").

In this exemplary embodiment, a location where authentication information is set in the DEVMODE structure is specified in accordance with the printer driver name, for the following reasons. If a location where authentication information is set in the DEVMODE structure is specified in accordance with the logical printer name, the following difficulties may arise. Since the logical printer name is freely changeable by a user, a location where authentication information is set may not be specified once a user changes the logical printer name. In addition, the same printer driver is generally used for printers manufactured by the same vendor even if the printers are different models. Thus, a location where authentication information is set is specified in accordance with the printer driver name rather than the printer model name, thus enabling the reduction in the number of library modules to be used to define a location where authentication information is set.

Figure 8:
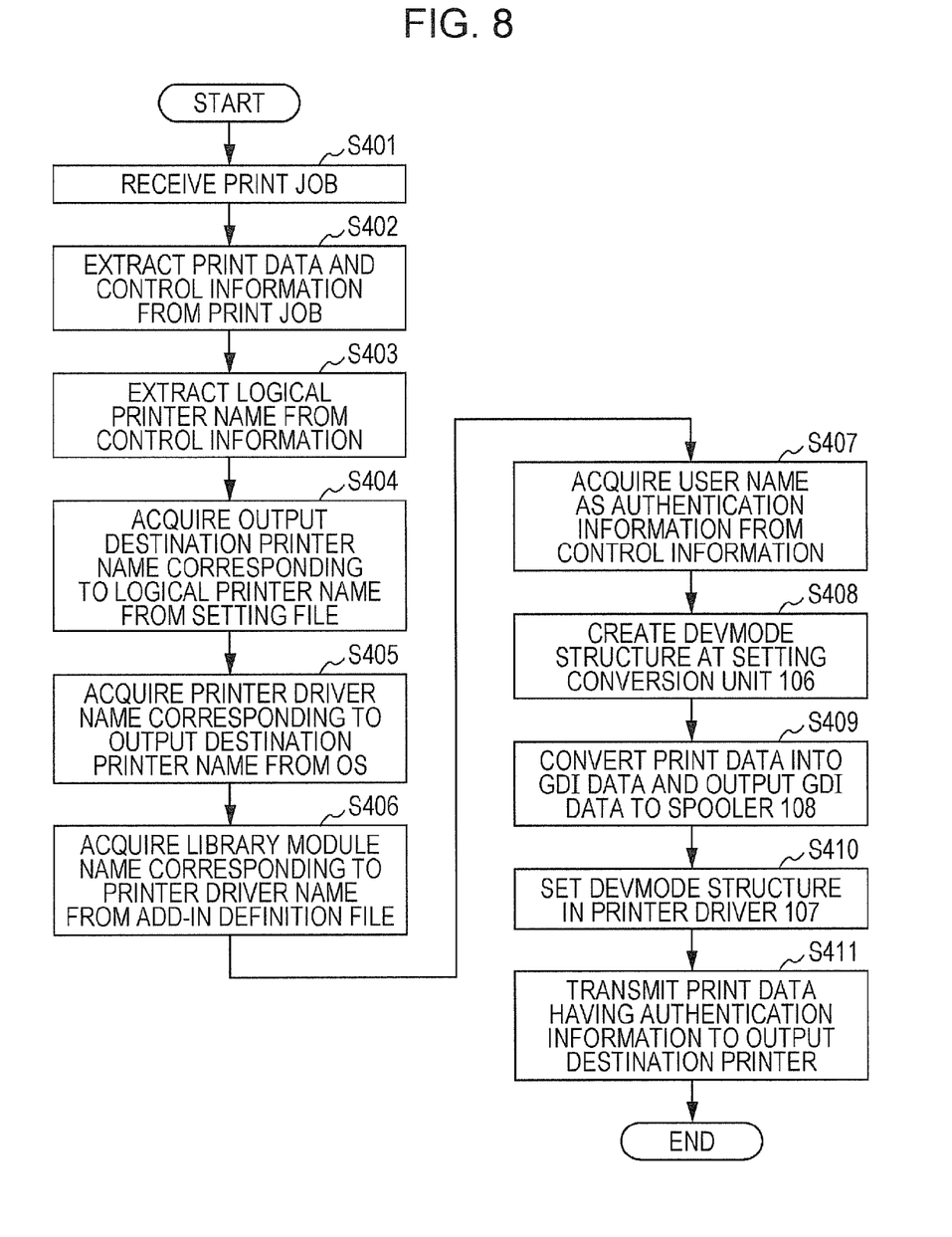
FIG. 8 is a flowchart illustrating the operation of the print server according to the exemplary embodiment of the present invention.

Next, the operation of the print server 30 according to this exemplary embodiment will be described with reference to a flowchart illustrated in FIG. 8.

First, the receiving unit 101 receives a print job from the host computer 20 (step S401). Then, the analysis unit 102 analyzes the print job to extract print data and control information from the print job (step S402). Then, the output unit 103 extracts a logical printer name from the control information (step S403), and acquires the printer name of the printer at the output destination corresponding to the logical printer name from a setting file (step S404).

Then, the output unit 103 acquires information concerning the printer driver name corresponding to the output destination printer name from OS definition information (step S405), and acquires the library module name corresponding to the acquired printer driver name from an add-in definition file stored in the add-in definition file storage unit 112 (step S406).

Then, the setting conversion unit 106 acquires the user name as authentication information from the control information (step S407), and sets the acquired authentication information in the setting location defined by the library module to create a DEVMODE structure (step S408).

The output unit 103 converts the print data into GDI data, and outputs the GDI data to the spooler 108 (step S409). Then, the output unit 103 sets the DEVMODE structure created by the setting conversion unit 106, in the printer driver 107 (step S410).

Then, the printer driver 107 outputs the print data having the authentication information to the printer specified as an output destination via the port monitor 109 (step S411).

Next, a specific operation method for setting the content of the setting file stored in the setting file storage unit 111, by using the UI unit 110 illustrated in FIG. 3 will be described with reference to FIG. 9.

Figure 9:
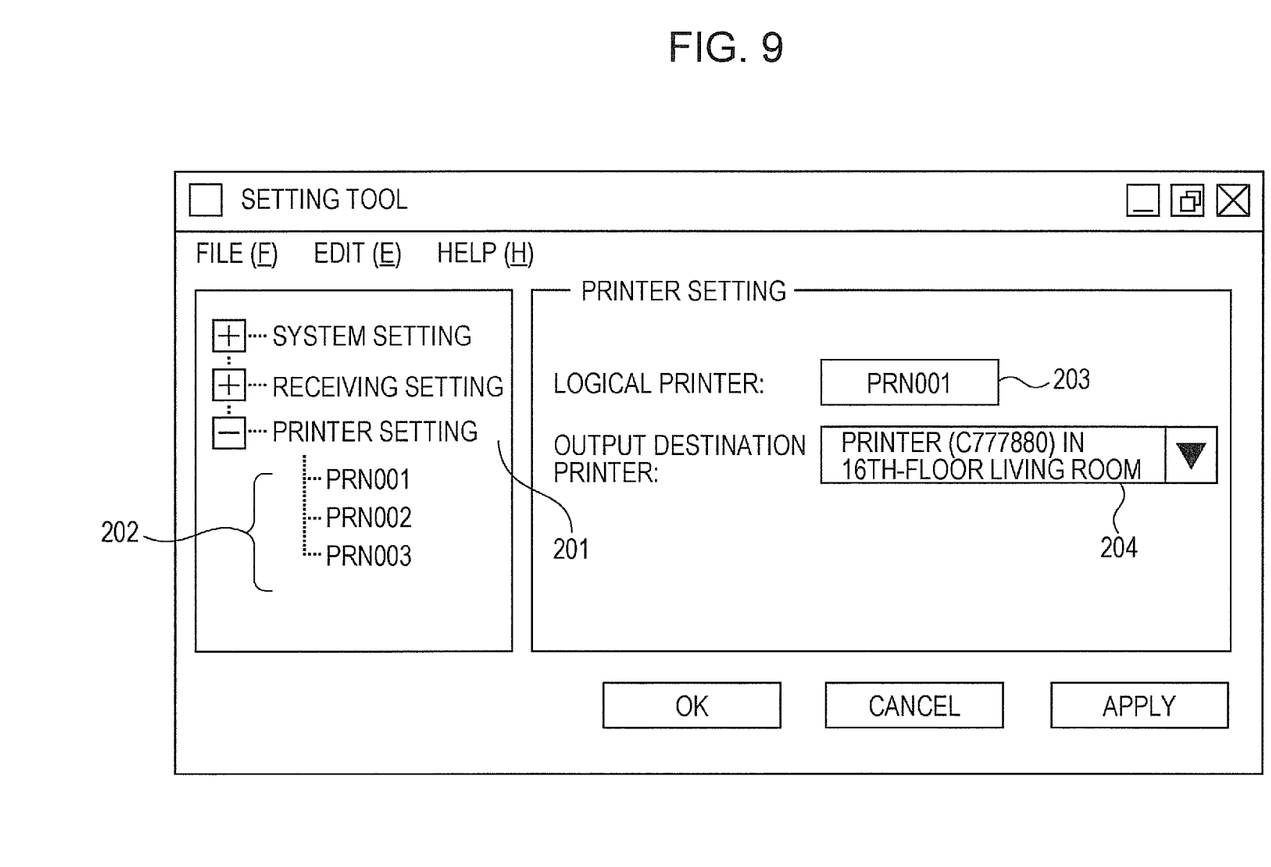
FIG. 9 illustrates an example of a user interface (UI) screen displayed on a UI unit.

FIG. 9 illustrates an example of a UI screen displayed on the UI unit 110. When a new logical printer is to be added on the UI screen, in a tree view, "Printer setting" 201 is selected and is right-clicked to add a new logical printer. In the tree view, furthermore, logical printers 202 are selected and right-clicked to copy or delete them. In addition, for each logical printer, a user is able to register a logical printer name 203 and select an output destination printer 204. The items set in the above manner are stored in the setting file storage unit 111 in form of a setting file.

Figure 10:
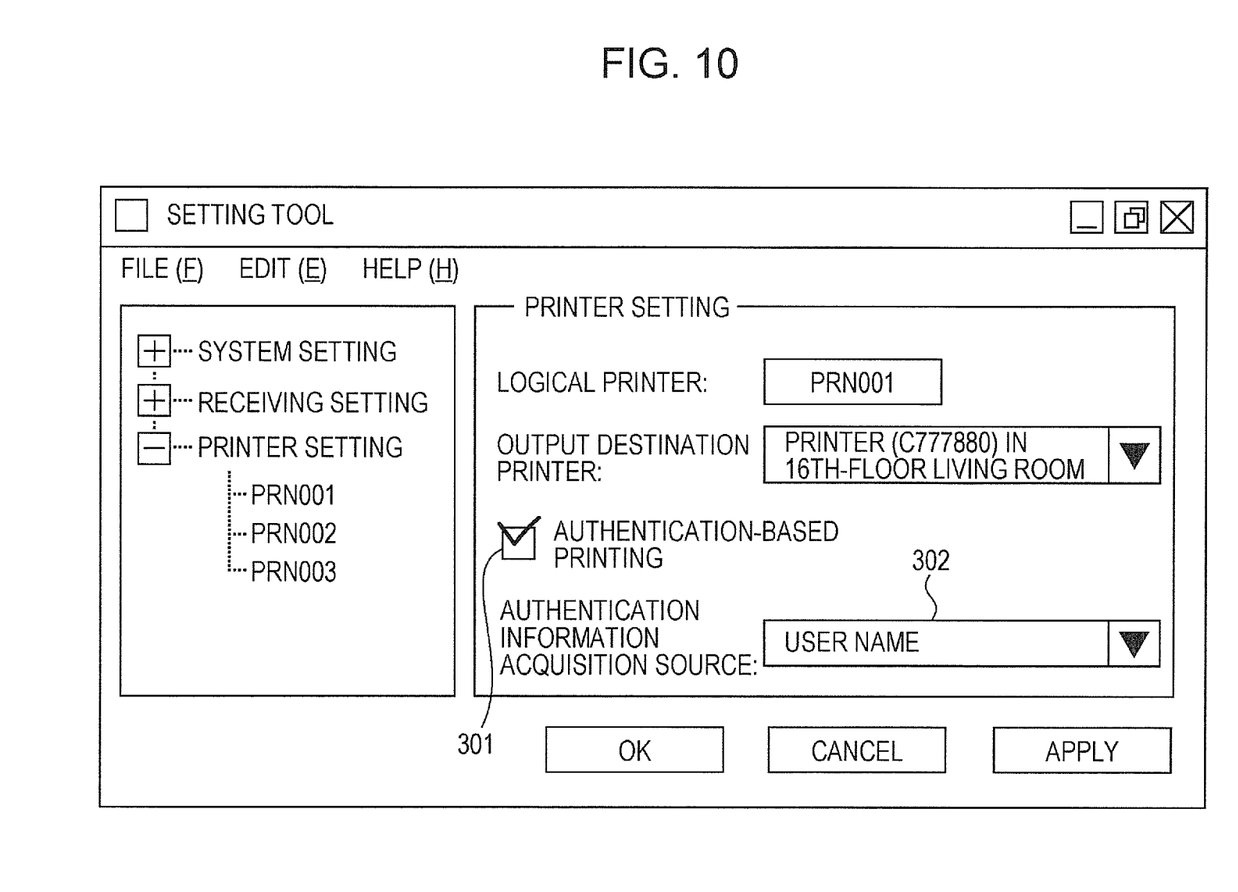
FIG. 10 illustrates an example of a UI screen further having a function to select, for each logical printer name, whether to perform authentication-based printing, and a function to specify an authentication information acquisition source.

In the foregoing exemplary embodiment, by way of example, a user name included in a print job transmitted from the host computer 20 is automatically set as authentication information. However, as illustrated in FIG. 10, the UI screen may further have a function 301 to select, for each logical printer name, whether to perform authentication-based printing, and a function 302 to specify an authentication information acquisition source, and the set items may be included in the setting file.

The above additional functions allow the output unit 103 to refer to the content of the setting file stored in the setting file storage unit 111 to determine whether or not authentication-based printing is required to execute a printing process based on a print instruction, in accordance with the acquired information concerning logical printer name (a "determining unit"). If the output unit 103 determines that authentication-based printing is required, the setting conversion unit 106 sets the authentication information in the DEVMODE structure. In addition to determining whether or not to perform authentication-based printing in accordance with the acquired information concerning the logical printer name, the output unit 103 may also determine whether or not to perform authentication-based printing in accordance with, for example, determination information that is set in advance for information such as the print job name, the output destination printer name, and the user name.

Figure 11:
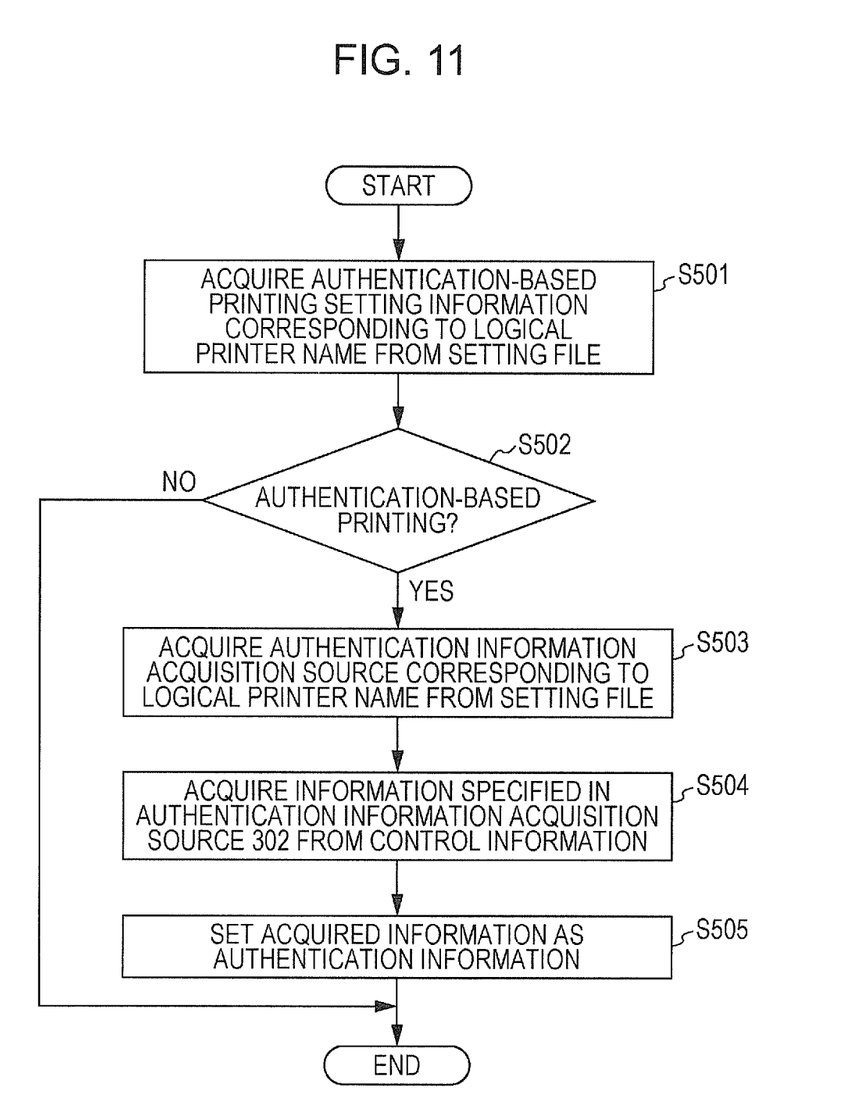
FIG. 11 is a flowchart illustrating a process for setting authentication information when it is determined whether or not to perform authentication-based printing, in accordance with preset determination information.

A process for setting authentication information using the above additional functions will be described with reference to a flowchart illustrated in FIG. 11.

The output unit 103 refers to the items in the setting file stored in the setting file storage unit 111 to acquire authentication-based printing setting information corresponding to the acquired logical printer name (step S501).

If the setting that authentication-based printing is not to be performed has been made in step S501 (no in step S502), the output unit 103 terminates the process without setting authentication information.

If the setting that authentication-based printing is to be performed has been made in step S501 (Yes in step S502), the output unit 103 acquires the source of acquisition of the authentication information corresponding to the logical printer name from the setting file (step S503), and acquires the specified information from the source of acquisition of the authentication information (step S504). Then, the output unit 103 sets the acquired information as authentication information (step S505).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control apparatus comprising:
   an acquiring unit that acquires information concerning a name of a printer driver to be used to control an operation of a printer, in accordance with a received print instruction;
   a storage unit that stores a table in which the name of the printer driver and definition information in which a setting location of authentication information in a DEVMODE structure is defined are associated with each other, the DEVMODE structure being a group of pieces of information to be referred to by the printer driver to generate print data;
   a specifying unit that specifies the setting location of the authentication information in the DEVMODE structure, in accordance with the information concerning the name of the printer driver acquired by the acquiring unit and the table stored in the storage unit;
   a setting unit that sets the authentication information in the setting location in the DEVMODE structure specified by the specifying unit; and
   a transmitting unit that generates print data having the authentication information in accordance with setting content of the DEVMODE structure in which the authentication information has been set by the setting unit, and that transmits the print data to the printer at an output destination.

2. The printing control apparatus according to claim 1, wherein the acquiring unit acquires information concerning a logical printer name from attribute information of the received print instruction, and acquires the information concerning the name of the printer driver to be used, in accordance with the acquired information concerning the logical printer name.

3. The printing control apparatus according to claim 2, further comprising a determining unit that determines whether or not authentication-based printing is required to execute a printing process based on the print instruction, in accordance with the information concerning the logical printer name acquired by the acquiring unit and a determination condition set in advance to determine whether or not to perform authentication-based printing, wherein
   if it is determined by the determining unit that authentication-based printing is required, the setting unit sets the authentication information in the DEVMODE structure.

4. The printing control apparatus according to claim 3, wherein the authentication information is information concerning a user name included in the received print instruction.

5. The printing control apparatus according to claim 2, wherein the authentication information is information concerning a user name included in the received print instruction.

6. The printing control apparatus according to claim 1, wherein the authentication information is information concerning a user name included in the received print instruction.

7. The printing control apparatus according to claim 1, wherein
   the table includes more than one correspondence relation between the name of the printer driver and the definition information, and
   the specifying unit specifies the setting location by selecting one correspondence relation from the more than one correspondence relation in the table, the selected correspondence relation including the name of the printer driver acquired by the acquiring unit.

8. The printing control apparatus according to claim 1, wherein the setting location is an address of a private area in the DEVMODE structure.

9. The printing control apparatus according to claim 8, wherein the definition information is different for each printer driver name.

10. A non-transitory computer readable medium storing a program causing a computer to execute a process, the process comprising:
    acquiring information concerning a name of a printer driver to be used to control an operation of a printer, in accordance with a received print instruction;
    storing a table in which the name of the printer driver and definition information in which a setting location of authentication information in a DEVMODE structure is defined are associated with each other, the DEVMODE structure being a group of pieces of information to be referred to by the printer driver to generate print data, and specifying the setting location of the authentication information in the DEVMODE structure, in accordance with the acquired information concerning the name of the printer driver and the stored table;
    setting the authentication information in the specified setting location in the DEVMODE structure; and
    generating print data having the authentication information in accordance with setting content of the DEVMODE structure in which the authentication information has been set, and transmitting the print data to the printer at an output destination.

11. The non-transitory computer readable medium according to claim 10, wherein
    the table includes more than one correspondence relation between the name of the printer driver and the definition information, and
    the setting location is specified by selecting one correspondence relation from the more than one correspondence relation in the table, the selected correspondence relation including the name of the printer driver acquired by the step of acquiring information, 12. The non-transitory computer readable medium according to claim 10, wherein the setting location is an address of a private area in the DEVMODE structure.

13. The non-transitory computer readable medium according to claim 12, wherein the definition information is different for each printer driver name.

* * * * *